United States Patent [19]

Bosselaar

[11] 3,738,156

[45] June 12, 1973

[54] METHOD USING TEST LIQUID AND ULTRASONIC LEAK DETECTOR FOR

[76] Inventor: Hendrik Bosselaar, 3 Badhuisweg, Amsterdam, Netherlands

[22] Filed: Apr. 6, 1971

[21] Appl. No.: 131,766

[30] Foreign Application Priority Data
Apr. 8, 1970  Netherlands...................... 7005002

[52] U.S. Cl............................................ 73/40.5 A
[51] Int. Cl. ............................................ G01m 3/08
[58] Field of Search ................. 73/40.5 A; 346/33 P

[56] References Cited
UNITED STATES PATENTS
3,508,433   4/1970   Bustin............................. 73/40.5 A Primary Examiner—S. Clement Swisher
Attorney—Theodore E. Bieber and Harold L. Denkler

[57] ABSTRACT

A method for detecting leaks in pipelines that is sensitive to acoustic signals in the ultrasonic range with the detector being transported through the pipeline by fluid flow. The method comprises transporting the detector through the pipeline while maintaining the detector in a test liquid having a viscosity of 30 cS maximum and a Reid vapor pressure of 10 psi maximum while recording the ultrasonic noise level.

5 Claims, No Drawings

METHOD USING TEST LIQUID AND ULTRASONIC LEAK DETECTOR FOR

BACKGROUND OF THE INVENTION

The invention relates to a process for the inspection of a pipeline with the aid of an acoustic leak detector which is transported through the pipeline with the flow of liquid through that pipeline.

A known process is the use for this purpose of a leak detector that is sensitive to acoustic signals in the ultrasonic range generated by liquid flowing from a small leak. It is preferred that the leak detector be present in a cylindrical casing or container that can be closed, which casing or container has an outside diameter which is smaller than the inside diameter of the pipeline, and which casing or container is provided with wheels and, if desired, with one or more collars that remain clear of the wall of the pipeline. The leak detector distinguishes the acoustic signal generated by a leak from background noise which is always present in a pipeline being on stream. The leak detector is further provided with recording equipment for recording data from which the presence of a leak as well as the location of that leak can be derived. It is possible for the inspection of a pipeline to take place without the pumping process being shut down. This permits frequent inspection at low cost. Furthermore, inspection is possible if the pipeline is located in regions to which access is difficult and if the pipeline is buried.

In order to demonstrate the reliability of this process and to perform a check on the proper operation of the leak detector, the pipeline may be provided with one or more artificial leaks at known locations, which leaks then are to be recorded by the leak detector. This is of great importance, because only in very rare cases does a leak occur in a pipeline that is on stream. From the recording of an artificial leak one knows for certain that the leak detector was operating properly. It has been found that there are optimum conditions for the detection of a leak. The invention provides a process by which the effectiveness of the process for acoustic inspection of a pipeline is increased.

DESCRIPTION OF PREFERRED EMBODIMENT

According to the invention the leak detector, while being transported through the pipeline, is present in a batch of liquid that differs from the liquids preceeding and following that batch, which batch of liquid under the conditions prevailing in the pipeline has a viscosity of 30 cS max. and a vapor pressure (according to Reid) of 10 psi (0.7 kj/cm$^2$ max.

It has been found from experiments that the generation of an acoustic signal in the ultrasonic range by an artificial leak takes place if the linear velocity of the liquid in the leak channel is not excessively low. As the pressure in the pipeline is fixed, the viscosity of the liquid must not be excessively high. It is preferred that the viscosity be 1 – 6 cS.

Experiments have also demonstrated that the generation of ultrasonic vibrations decreases if gas forms at the exit end of the leak channel, which is more likely to happen accordingly as the vapor pressure of the liquid is higher. It is preferred that the vapor pressure (according to Reid) is 3 psi (0.21 kj/cm$^2$) max.

The leak detector is transported through the pipeline by the moving liquid. In general, movement occurs of the liquid relative to the leak detector. It may happen that the rate of travel of the leak detector is lower than the rate of volume flow of the liquid, but the reverse may also occur. Various factors are involved here, such as the slope of the pipeline, the size of the collars around the casing of the leak detector, the difference in specific mass between the liquid and the leak detector and the distribution of liquid velocities over a cross section of the pipeline. It is intended that the leak detector during its inspectional journey through the pipeline remains in the batch of liquid having the specified properties. This can be accomplished if the volume of that batch of liquid is 5 – 30 percent of the volume of the pipeline. The term volume of the pipeline is defined as the volume of that part of the pipeline that is being inspected by the leak detector. Normally it will be found that a volume of the batch of liquid of 10 percent (max.) of the volume of the pipeline is sufficient.

The procedure of pumping different liquids in succession through a pipeline is widely applied. Owing to the turbulent flow of the liquid, mixing at the interfaces is restricted. Many crude oils are suitable liquids for the application of the process according to the invention. In addition, gas oil and domestic fuel oil are particularly suitable. Another suitable liquid is water, but its use may be undesirable in view of corrosion phenomena.

I claim as my invention:

1. A process for the inspection of a pipeline with the aid of an acoustic leak detector, said leak detector being transported through the pipeline by the flow of liquid through the pipeline; said process comprising:
    replacing a portion of the liquid flowing in the pipeline with a test liquid under the conditions prevailing in the pipeline, said test liquid having a viscosity of 30 cS max. and a Reid vapor pressure of 10 psi max.; and
    transporting the leak detector through the pipeline while maintaining the leak detector within said test liquid.

2. A process according to claim 6, in which process the viscosity is 1 – 6 cS.

3. A process according to claim 6 in which process the vapor pressure is 3 psi (0.21 kg/cm$^2$) max.

4. A process according to claim 6 in which process the volume of the test liquid is 5 – 30 percent of the volume of the pipeline.

5. A process according to claim 4, in which process the volume is not more than 10 percent of the volume of the pipeline.